United States Patent
Jiang

(10) Patent No.: US 9,720,308 B2
(45) Date of Patent: Aug. 1, 2017

(54) ELECTRONIC DEVICE

(71) Applicant: Lenovo (Beijing) Co., Ltd., Beijing (CN)

(72) Inventor: Hao Jiang, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 0 days.

(21) Appl. No.: 14/751,803

(22) Filed: Jun. 26, 2015

(65) Prior Publication Data

US 2016/0266478 A1    Sep. 15, 2016

(30) Foreign Application Priority Data

Mar. 9, 2015    (CN) .......................... 2015 1 0103693

(51) Int. Cl.
| | |
|---|---|
| G03B 21/14 | (2006.01) |
| G03B 21/30 | (2006.01) |
| H04N 9/31 | (2006.01) |
| G03B 29/00 | (2006.01) |

(52) U.S. Cl.
CPC ........... *G03B 21/145* (2013.01); *G03B 29/00* (2013.01); *H04N 9/3173* (2013.01); *G03B 21/30* (2013.01); *H04N 9/3176* (2013.01)

(58) Field of Classification Search
CPC .... G03B 21/145; G03B 21/134; G03B 21/14; G03B 21/30; G03B 21/00; H04N 9/3176; H04N 9/3173; H04N 9/3141

USPC .................................................. 353/119, 122
See application file for complete search history.

(56) References Cited

U.S. PATENT DOCUMENTS

2009/0257176 A1* 10/2009 Yang ..................... G06F 1/1603
                                                                          361/679.01
2012/0229779 A1*  9/2012 Shiramizu ........... G03B 21/142
                                                                          353/70

* cited by examiner

*Primary Examiner* — William C Dowling
*Assistant Examiner* — Ryan Howard
(74) *Attorney, Agent, or Firm* — Harness, Dickey & Pierce, P.L.C.

(57) ABSTRACT

An electronic device is provided in the present application, which includes a first component; a display arranged on a first surface of the first component; a second component, which includes a supporting body and a projector, the second component being arranged at a first lateral portion of the first component and the projector being arranged on the supporting body; and a connecting member arranged at the first lateral portion of the first component. The supporting body is movable with respect to the first component via the connecting member, the projector is rotatable with the rotation of the supporting body, and the projector moves to a second relative position with respect to the first component when the supporting body moves to a first relative position with respect to the first component.

6 Claims, 1 Drawing Sheet

ELECTRONIC DEVICE

The present application claims the benefit of priority to Chinese patent application No. 201510103693.1 titled "ELECTRONIC DEVICE", filed with the Chinese State Intellectual Property Office on Mar. 9, 2015, the entire disclosure of which is incorporated herein by reference.

TECHNICAL FIELD

The present application relates to the field of electronic technique, and in particular to an electronic device.

BACKGROUND

With the continuous development of science technology, it is becoming more and more popular to provide a projecting function on a mobile device such as a mobile phone or a tablet computer, and with the projecting function of the mobile device, a user can project contents displayed on the mobile phone or the tablet computer onto a carrying surface, such as a wall, to share the contents with other people.

Presently, when the electronic device is performing a projection operation, for allowing the electronic device to project in different angles, the electronic device is supported by a bracket or is fixed manually by the user to project in different angles.

However, the above technology at least has the following technical issues.

In the case that the bracket is employed to support the electronic device, a form of the bracket needs to be adjusted if the user needs to change a projection angle, and the operation process is complicated. In the case that the electronic device is manually fixed by the user for projecting, the user may simply adjust the projection angle by hand; however an influence to the projection quality caused by shaking of the hand can't be avoided. Thus, the conventional technology has the technical issue that the electronic device is unable to independently perform the projecting operation in various angles.

SUMMARY

The electronic device according to embodiments of the present application includes a first component, a display arranged on a first surface of the first component, a second component, and a connecting member. The second component includes a supporting body and a projector, and the projector is arranged on the supporting body. The connecting member is arranged on the first component. Wherein, the second component is rotatably connected to the first component via the connecting member.

DETAILED DESCRIPTION

Figure 1:
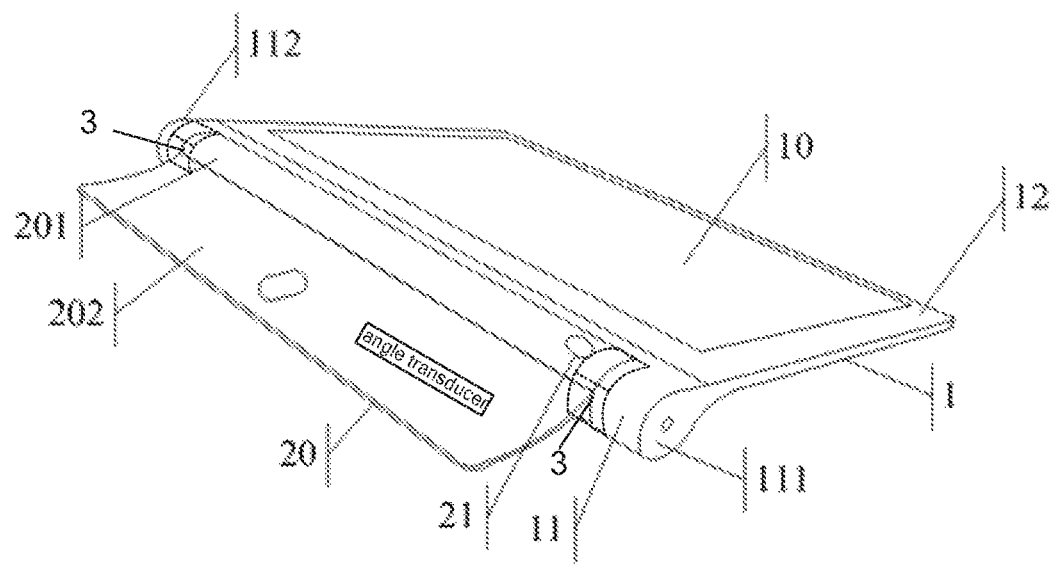
FIG. 1 is a schematic view showing the structure of an electronic device according to an embodiment of the present application.

An electronic device is provided according to embodiments of the present application, to address the technical issue in the conventional technology that the electronic device is unable to independently perform the projecting operation in various angles. The electronic device according to embodiments of the present application can independently perform the projecting operation in various angles.

For addressing the above technical issue in the conventional technology, technical solutions according to embodiments of the present application are described as follows.

An electronic device includes a first component, a display arranged on a first surface of the first component, a second component, and a connecting member. The second component includes a supporting body and a projector, the second component is arranged at a first lateral portion of the first component, and the projector is arranged on the supporting body. The connecting member is arranged at the first lateral portion of the first component. The supporting body is movable with respect to the first component via the connecting member, the projector is rotatable with the rotation of the supporting body, and the projector moves to a second relative position with respect to the first component when the supporting body moves to a first relative position with respect to the first component. wherein the first lateral portion of the first component is a lateral portion of a side of the first component where the first component is in contact with a support surface in the case that a user uses the electronic device with the display facing the user.

According to the above description, the second component and the connecting member are arranged at the first lateral portion of the electronic device, the second component includes the supporting body and the projector, the supporting body is movable with respect to the first component via the connecting member, and the projector is arranged on the supporting body, therefore, the projector is rotatable with the rotation of the supporting body, and when the supporting body moves to the first relative position with respect to the first component, the projector moves to the second relative position with respect to the first component, thus the position of the projector with respect to the first component is changed, thereby effectively solving the technical issue in the conventional technology that the electronic device is unable to independently perform the projecting operation in various angles, and providing a device which can independently perform the projecting operation in various angles, to improve the user experience.

Further, when the supporting body moves to the first relative position with respect to the first component, the supporting body is configured to support the first component, thereby allowing the electronic device to be independently placed on a plane, such as a table top.

In addition, the term "and/or" in the specification is only intended to describe the association relationship of associated objects, and indicates three relationships, for example, A and/or B may indicate three cases that: A separately exists, A and B simultaneously exist, or B separately exists. Besides, the character "/" in the specification generally indicates an "or" relationship between the associated objects before and after "/".

The main implementation principles, embodiments, corresponding advantageous effects of the technical solutions according to the embodiments of the present application are described in details in conjunction with drawings.

Figure 2:
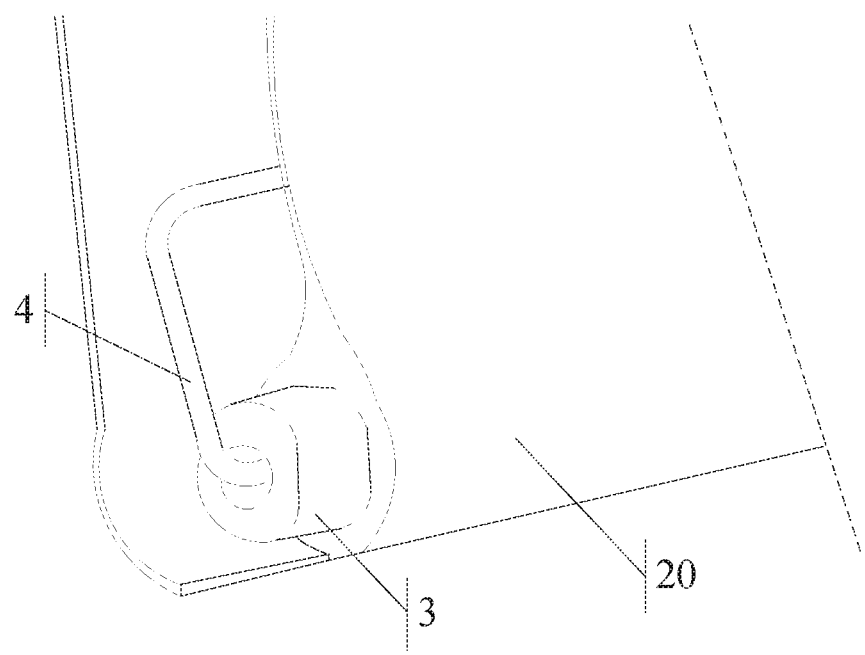
FIG. 2 is a schematic view showing a connecting member according to an embodiment of the present application.

As shown in FIGS. 1 and 2, an electronic device is provided according to an embodiment of the present application, which includes a first component 1, a display 10 arranged on a first surface 12 of the first component, a second component, and a connecting member 3. The second component includes a supporting body 20 and a projector 21, the second component is arranged at a first lateral portion 11 of the first component 1, and the projector 21 is arranged on the supporting body 20. The connecting member 3 is arranged at the first lateral portion 11 of the first component 1.

The supporting body 20 is movable with respect to the first component 1 via the connecting member 3, the projector 21 is rotatable with the rotation of the supporting body 20, and the projector 21 moves to a second relative position with respect to the first component 1 when the supporting body 20 moves to a first relative position with respect to the first component 1.

The second component is described hereinafter.

In the embodiment of the present application, the second component includes the supporting body 20 and the projector 21, the projector 21 is arranged on the supporting body 20, that is, with the rotation of the supporting body 20 with respect to the first component 1, the projector 21 may also rotate with respect to the first component 1, thereby changing the projection angle of the electronic device.

The supporting body 20 may include a first portion 201 sleeved on the connecting member 3, and a second portion 202 formed integrally with the first portion 201. The projector 21 is arranged on the first portion 201, and when the projector 21 projects content, to be projected, on the display 10 onto a first display area, the projector 21 is at a lateral portion of the electronic device.

The supporting body 20 and the connecting member 3 may be formed integrally. Or, the supporting body 20 may be sleeved on the connecting member 3, and in this case, the supporting body 20 and the connecting member 3 are fixedly connected, that is, when the connecting member 3 moves, the supporting body 20 is also driven to move. Further, in an embodiment of the present application, when the supporting body 20 moves to the first relative position with respect to the first component 1, the supporting body 20 is configured to support the first component 1, thereby allowing the electronic device to be independently placed on a plane, such as a table top.

In the above solution, the projector 21 of the electronic device is arranged on the rotatable supporting body 20, and the supporting body 20 rotates to drive the projector 21 to rotate, thereby changing the projection angle of the electronic device. In addition, due to the support of the supporting body 20, the electronic device can be independently placed on the plane, thereby further realizing the technical effect that the electronic device can independently project in various angles.

The first component 1 is described hereinafter.

In an embodiment of the present application, the first lateral portion 11 of the first component 1 is a lateral portion of a side of the first component 1 where the first component 1 is in contact with a support surface, such as a table top, when a user uses the electronic device in a normal mode, namely the display faces the user. In actual use, the display 10 may be a common light emitting diode (LED) display screen, or a touch display screen, or a flexible screen, which is not limited in the present application, as long as the display 10 has a display function.

The first lateral portion includes a first end portion 111 and a second end portion 112, a first subsidiary connecting portion is provided at the first end portion 111, and a second subsidiary connecting portion is provided at the second end portion 112. The connecting member 3 is connected to the first component 1 via the first subsidiary connecting portion and the second subsidiary connecting portion.

Preferably, the first subsidiary connecting portion and the second subsidiary connecting portion are respectively sleeved on the connecting member 3, which enables the connecting member 3 to be rotatable in the first subsidiary connecting portion and the second subsidiary connecting portion, thus the connecting member 3 can drive the supporting body 20 and the projector 21 to rotate with respect to the first component 1.

In a specific implementing process, the first subsidiary connecting portion and the second subsidiary connecting portion are both embodied as a cavity, and the connecting member 3 is embodied as a rotating shaft. Two ends of the rotating shaft are respectively accommodated in the first subsidiary connecting portion and the second subsidiary connecting portion, that is, the first subsidiary connecting portion and the second subsidiary connecting portion are respectively sleeved on the connecting member 3.

Specifically, the connecting member 3 may be one rotating shaft, the first subsidiary connecting portion is sleeved on one end of the rotating shaft, and the second subsidiary connecting portion is sleeved on another end of the rotating shaft. In actual use, the connecting member 3 may also be embodied as two rotating shafts having a same diameter, the first subsidiary connecting portion is sleeved on a first rotating shaft of the two rotating shafts, and the second subsidiary connecting portion is sleeved on a second rotating shaft of the two rotating shafts. For example, a distance between the first end portion and the second end portion is 20 cm, and the length of each of the two rotating shafts may be 5 cm, or 6 cm, which are not limited in the present application. In this case, supposed that the supporting body 20 is sleeved on the rotating shafts, a cavity may be formed between the two rotating shafts, and the cavity may be configured to accommodate components of the electronic device which have a large volume, such as an audible device, a camera, and etc., which is not limited in the present application.

In specific implementing process, the rotating shaft may be a damping rotating shaft, which can maintain the position of the supporting body 20 when the supporting body 20 rotates to the first relative position with respect to the first component 1.

In an embodiment of the present application, as shown in FIG. 2, one cavity may be provided inside the connecting member 3 to act as a cable-laying channel, and the cable-laying channel is configured to accommodate cables between the projector 21 and a mainboard. Specifically, the cable-laying channel is arranged along an axial direction of the connecting member 3. A data transmission wire 4, that is a wire between the projector 21 and the mainboard, passes through the cable-laying channel and then passes through the interior of the first subsidiary connecting portion or the interior of the second subsidiary connecting portion to be further connected to the mainboard, thereby saving the cable-laying space, and also preventing data transmission of the data transmission cable 4 from being adversely affected by the rotation of the supporting body 20.

In an embodiment of the present application, the electronic device further includes an angle transducer, which is arranged on the first component 1 or the second component and configured to detect a first included angle between the projector 21 and the first component 1.

The usage modes of the electronic device are different in the case that the first included angle is within different angle ranges, and the usage modes of the electronic device in the embodiments of the present application are described hereinafter.

When the projector 21 is performing a projection operation, the display 10 is controlled to be in a state with backlight being switched off in the case that it is detected that the first included angle is within a first angle range.

For example, in a scene, the angle transducer detects that the included angle between the projector 21 and the first component 1 is 180 degrees, the display in this case faces a ceiling, the user projects the display content onto the ceiling, thus the display 10 may be controlled to be in the state with backlight being switched off, which may lengthen the battery life of the electronic device.

In a specific implementing process, the first angle range may range from 160 degrees to 180 degrees, and the electronic device can project the display content onto an area which the display 10 faces, such as the ceiling, as shown in FIG. 1, the electronic device is supported on the plane via the supporting body 20 and a second lateral portion of the electronic device.

When the projector 21 is performing a projection operation, the display 10 is controlled to be in a state with backlight being switched on in the case that it is detected that the first included angle is within a second angle range.

For example, in a scene, the user uses the electronic device in a normal mode, that is the display 10 faces the user, supposed that the angle transducer detects that the included angle between the projector 21 and the first component 1 is 45 degrees, the display 10 is controlled to be in the state with backlight being switched on.

In a specific implementing process, the second angle range may range from 30 degrees to 60 degrees, the electronic device can project the display content onto an area which a backboard of the electronic device faces, such as the wall, and in this case, the electronic device is supported on the plane via the supporting body 20 and the second lateral portion of the electronic device, and in embodiments of the present application, the backboard is a face opposite to the first surface 12.

One or more of the following technical effects can be realized through one or more technical solutions in embodiments of the present application.

1. In the technical solutions according to the embodiments of the present application, the second component and the connecting member are arranged at the first lateral portion of the electronic device, the second component includes the supporting body and the projector, the supporting body is movable with respect to the first component via the connecting member, and the projector is provided on the supporting body, therefore the projector is rotatable with the rotation of the supporting body, and when the supporting body moves to the first relative position with respect to the first component, the projector moves to the second relative position with respect to the first component, thus the position of the projector with respect to the first component is changed, thereby effectively solving the technical issue in the conventional technology that the electronic device is unable to independently perform the projecting operation in various angles, and providing a device which can independently perform the projecting operation in various angles, to improve the user experience.

2. In the technical solutions according to the embodiments of the present application, the cable-laying channel is provided inside the connecting member, thus the cable between the projector and the mainboard of the electronic device can be arranged inside the cable-laying channel, which on the one hand saves the cable-laying space, and on the other hand prevents the data transmission from being adversely affected by the rotation of the supporting body.

3. In the technical solutions according to the embodiments of the present application, the electronic device is provided with the angle transducer, thus the included angle between the projector and the first component can be detected by the angle transducer. Specifically, the display is in the state with backlight being switched off in the case that the projector projects the content, to be projected, on the display onto the first display area and the first included angle is within the first angle range; and the display is in the state with backlight being switched on in the case that the projector projects the content to be projected onto the second display area and the first included angle is within the second angle range, thereby lengthening the battery life of the electronic device without affecting the using of the electronic device for the user.

Although preferred embodiments of the present application are described hereinabove, other alterations and modifications can be made to the embodiments of the present application by those skilled in the field once those skilled in the field knows the basic creative concept of the present application. Therefore the claims are intended to include the preferred embodiments and all of the alterations and modifications falling into the scope of the present application.

It is obvious that, for the person skilled in the art, a few of modifications and variations may be made to the present application without departing from the principle and scope of the present application. Thus, if these modifications and variations fall into the scope of the claims and the equivalent technology, the present application is deemed to include these modifications and variations.

The invention claimed is:

1. An electronic device, comprising:
   a first component;
   a display arranged on a first surface of the first component;
   a second component, comprising a supporting body and a projector, and the projector being arranged on the supporting body;
   a connecting member arranged on the first component; wherein the second component is rotatably connected to the first component via the connecting member; and
   an angle transducer, which is arranged on the first component or the second component and configured to detect a first included angle between the projector and the first component,
   wherein the supporting body is configured to support the first component so that the electronic device is independently placed on a plane,
   wherein the display is configured to be in a state with a backlight being switched off in the case that content to be projected on the display is projected by the projector onto a first display area and the first included angle is within a first angle range, and
   wherein the display is configured to be in a state with the backlight being switched on in the case that the content to be projected is projected by the projector onto a second display area and the first included angle is within a second angle range.

2. The electronic device according to claim 1, wherein the second component is arranged at a first lateral portion of the first component, and the connecting member is arranged at the first lateral portion of the first component.

3. The electronic device according to claim 2, wherein, the supporting body is movable with respect to the first component via the connecting member, the projector is rotatable with the rotation of the supporting body, and the projector is configured to move to a second relative position with respect to the first component in the case that the supporting body moves to a first relative position with respect to the first component.

4. The electronic device according to claim 1, wherein the supporting body comprises a first portion sleeved on the connecting member, and a second portion formed integrally with the first portion, the projector is arranged on the first portion, and the projector is at a lateral portion of the electronic device in the case that content, to be projected, on the display is projected by the projector onto a first display area.

5. The electronic device according to claim 1, further comprising:
   a cable-laying channel arranged inside the connecting member and arranged along an axial direction of the connecting member; and
   a data transmission cable, comprising a first connecting end and a second connecting end, wherein, the first connecting end is connected to the projector, the second connecting end is connected to a mainboard of the electronic device, and the data transmission cable is configured to pass through the cable-laying channel and pass an interior of the first subsidiary connecting portion or the second subsidiary connecting portion.

6. The electronic device according to claim 3, wherein the supporting body is configured to support the first component in the case that the supporting body moves to the first relative position with respect to the first component.

* * * * *